(12) United States Patent
Meijer et al.

(10) Patent No.: US 7,779,396 B2
(45) Date of Patent: Aug. 17, 2010

(54) SYNTACTIC PROGRAM LANGUAGE TRANSLATION

(75) Inventors: Henricus Johannes Maria Meijer, Mercer Island, WA (US); Avner Y. Aharoni, Seattle, WA (US); Haroon Ahmed, Bellevue, WA (US); Todd F. Pfleiger, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 11/200,911

(22) Filed: Aug. 10, 2005

(65) Prior Publication Data

US 2007/0038985 A1 Feb. 15, 2007

(51) Int. Cl.
*G06F 9/45* (2006.01)
(52) U.S. Cl. ...................... 717/137; 717/143
(58) Field of Classification Search ......... 717/136–137, 717/140, 143
See application file for complete search history.

(56) References Cited

U.S. PATENT DOCUMENTS

| | | | | |
|---|---|---|---|---|
| 5,493,675 | A * | 2/1996 | Faiman et al. | 717/151 |
| 6,523,172 | B1 * | 2/2003 | Martinez-Guerra et al. | 717/143 |
| 6,611,844 | B1 * | 8/2003 | Saulpaugh et al. | 707/103 R |
| 6,654,734 | B1 | 11/2003 | Mani et al. | |
| 2002/0040292 | A1 * | 4/2002 | Marcu | 704/4 |
| 2003/0204511 | A1 | 10/2003 | Brundage | |
| 2004/0098384 | A1 | 5/2004 | Min | |
| 2004/0193575 | A1 | 9/2004 | Chen | |
| 2004/0260691 | A1 | 12/2004 | Desai | |
| 2005/0055336 | A1 * | 3/2005 | Hui et al. | 707/3 |
| 2005/0278697 | A1 * | 12/2005 | Hodge | 717/115 |
| 2006/0080646 | A1 * | 4/2006 | Aman | 717/143 |
| 2006/0230393 | A1 * | 10/2006 | Doh et al. | 717/137 |
| 2006/0265689 | A1 * | 11/2006 | Kuznetsov et al. | 717/117 |
| 2007/0028221 | A1 * | 2/2007 | Ukelson et al. | 717/136 |

FOREIGN PATENT DOCUMENTS

| | | |
|---|---|---|
| WO | WO2004068270 | 8/2004 |
| WO | WO2004077277 | 9/2004 |

OTHER PUBLICATIONS

Dodds, Leigh; "XML.com: XQuery Questioned", 2002, p. 1-4, retrieved Oct. 1, 2007 from URL <http://www.xml.com/lpt/a/898> via scholar.google.com search.*
Christophides, Vassilis et al.; "On Wrapping Query Languages and Efficient XML Integration", p. 141-152, ACM 2000, retrieved Oct. 1, 2007.*

(Continued)

*Primary Examiner*—Anna Deng
(74) *Attorney, Agent, or Firm*—Workman Nydegger

(57) ABSTRACT

The subject disclosure pertains to computer programming languages and translation or conversion thereof. Rather than a complicated semantics preserving translation or conversion from a first source language to a second target language, the conversion can be one of syntax. The conversion can be accomplished, for example, via employment of a map that defines the relation between the syntax of the first language and the second language. The semantics of at least a part of the first language can be defined by the second target language. Thus, the first language can be open-ended and/or semantically extensible based on the second language.

13 Claims, 13 Drawing Sheets

OTHER PUBLICATIONS

DeHaan, David et al.; "A Comprehensive XQuery to SQL Translation using Dynamic Interval Encoding", 2003, p. 623-634, ACM, retrieved Oct. 1, 2007.*

Lammel, Ralf; Meijer, Erik; "Mappings make data processing go 'round", 2005, p. 1-52, retrieved from scholar.google.com.*

IBM, WebSphere Studio Application Developer, http://www-306.ibm.com/software/awdtools/studioappdev/about/. Last accessed Aug. 10, 2005. 10 pages.

Oracle. Oracle SQL/XML. 2005. http://www.oracle.com/technology/products/database/application_development/sqlxml/index.html. Last accessed Aug. 10, 2005. 1 page.

Microsoft, Rich XML Support. Oct. 1, 2000. http://www.microsoft.com/sql/evaluation/features/richxml.mspx. Last accessed Aug. 1, 2005. 2 pages.

International Search Report dated Oct. 1, 2007, mailed Oct. 23, 2007 for PCT Application Serial No. 2006/28387, 4 pages.

* cited by examiner

SYNTACTIC PROGRAM LANGUAGE TRANSLATION

BACKGROUND

Computer programs are lists of instructions that describe actions to be performed by a computer or processor-based device. When a computer program is loaded and executed on computer hardware, the computer will behave in a predetermined manner by following the instructions of the computer program. Accordingly, the computer becomes a specialized machine that performs the tasks prescribed by the instructions. A programmer using a programming language creates the instructions comprising a computer program. As computer programs became more sophisticated, programming languages have evolved from low-level machine code languages, easily understood by computers, to high-level source code languages more readily comprehensible to humans.

Programming languages are typically classified into categories based upon the characteristics and features of the language. For example, C is often described as a procedural programming language as it is based upon the concept of modularity and scope of program code. C# and Java are object-oriented programming languages tuned to the creation and manipulation of program code as object classes. Data-oriented languages including SQL (Structured Query Language) and XPath are drawn toward search and manipulation of stored data such as relational or XML (Extensible Markup Language) data. As a consequence of this specialization, individual programming languages have particular strengths and weaknesses.

Programmers today often prefer developing a computer program in a specific language with which they have extensive experience or is most appropriate for a large portion of a project. However, programmers appreciate the specialization among programming languages and would like to utilize the best language for particular tasks. For instance, a C# programmer may wish to interface with a relational database using SQL, thus benefiting from the data-oriented aspects and efficiencies of SQL. One way to accomplish this could be to translate a C# query expression into a SQL query expression. Integration of programming languages requires a semantic translation from a first language to a second language. This ensures the meaning of all programmatic statements, expressions and the like specified in the first language are translated to the syntax of the second language that has the same meaning specified by the first language. Often this involves a very different syntax as well as many data conversions to preserve the first language semantics.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, programming language translation systems and methods are provided herein. In particular, language elements or constructs including but not limited to expressions can be subjected to a syntactic translation from a first source language to a second target language. The translation or expansion can be syntactic, guided by a map or mapping rather than completely semantic. At least a portion of an expression or sub-expression, for instance, can be translated one-to-one such that what is denoted in the source language expression is translated verbatim to the target language. This type of translation enables semantics to be defined by the target language rather than the source and produces predictable translations, among other things.

Furthermore, systems and methods are provided for generating a map used in the syntactic translation. The map can be populated based on the matching program syntax of the source and target language as well as context or implementation specific information. Maps can be generated by a translation system author or vendor. Additionally or alternatively, non-native maps can be provided by others, plugged-in, and utilized like native maps to facilitate translation or expansion from one language to another.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the claimed subject matter are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
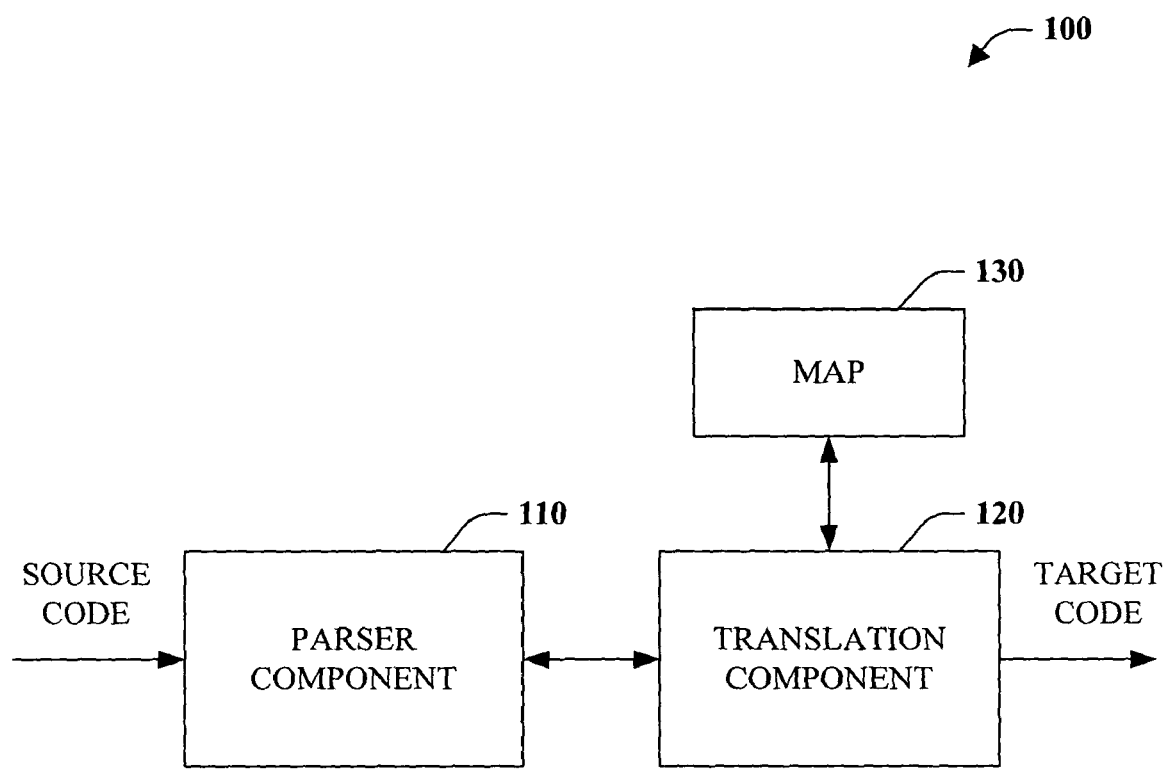
FIG. 1 is a block diagram of program code translation system.

Turning initially to FIG. 1, a program code translation system 100 is depicted. System 100 includes a parser component 110, a translation component 120 and a map 130. Parser component 110 receives programmatic code and parses it into tokens and parse trees representing base elements in a language such as symbols, operators (e.g., +, −, *, =, ==, &, % . . . ), types and the like. These tokens are passed individually or as a collection, parse tree, to the translation component 120. The translation component 120 receives the tokens or collection of tokens and expands or translates them from the first source program language to corresponding elements in a second target language. For example, an equal sign "=" in the first language could be mapped to an equal sign in the second language. To facilitate such translation or expansion, the translation component 120 can interact with and be guided by map 130. Map 130 provides a map or mapping between the syntax, operations, and names of the first language and the syntax, operations and names of the second language. The map 130 can include a record of not only base elements that are common to programming languages but also context or implementation specific information such as field, variable and/or table names. Accordingly, upon receiving a particular token or language element from the parser 110 the translation component 120 can identify such element in the map 130 and retrieve the corresponding element or elements in the second language. The transformation or translation from the input or source code to the target code can be purely syntactic. However, the map 130 can embody at least some language semantics.

Figure 2A:
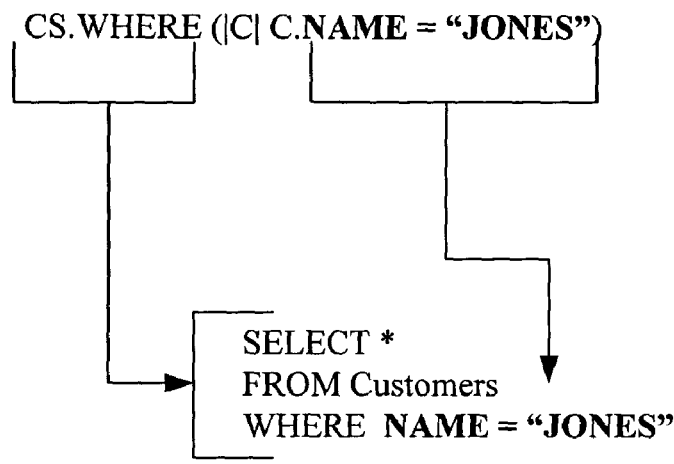
FIG. 2a illustrates an exemplary diagram of a language translation or expansion.

FIG. 2a illustrates a simple exemplary translation 200a to facilitate clarity in understanding the translation provided by system 100 of FIG. 1. It should be noted that although, expressed as a translation from C# to SQL, the invention is by no means limited thereto. Any other languages can be employed. The example could have just as easily utilized different languages (e.g., XPath/XQuery to SQL . . . ). By way of example and not limitation, an object-oriented language expression or code can be received for example by parser 110 and ultimately translated or expanded to SQL code by the translation component 120. Here, the expression is a query expression that corresponds to cs.where (|c| c.name="Jones"). The exemplary expression includes typical object-oriented dot operators as well as a lambda filter expression or sub-expression. The statement declares find all customers (cs) where the customer's name is Jones. There are two main expansions that happen here. First, the main expression "cs.where" can be translated or expanded based on the syntactic map 130 to "Select*From Customers Where." The object-oriented statement corresponds to making a selection from "cs" which can correspond to a customer or customers table. Next, the sub-expression, here a lambda expression, can be translated and utilized to populate the expanded main expression. In this case, the filter or selection expression says select a customer (c) from customers (cs) where the name is Jones. This can be translated to simply name="Jones" and inserted as an argument to the Where parameter of the Select statement. It should be noted that there is a direct translation of name="Jones" in the source language to name="Jones" in the target or destination language without consideration of the semantic meaning.

Figure 2B:
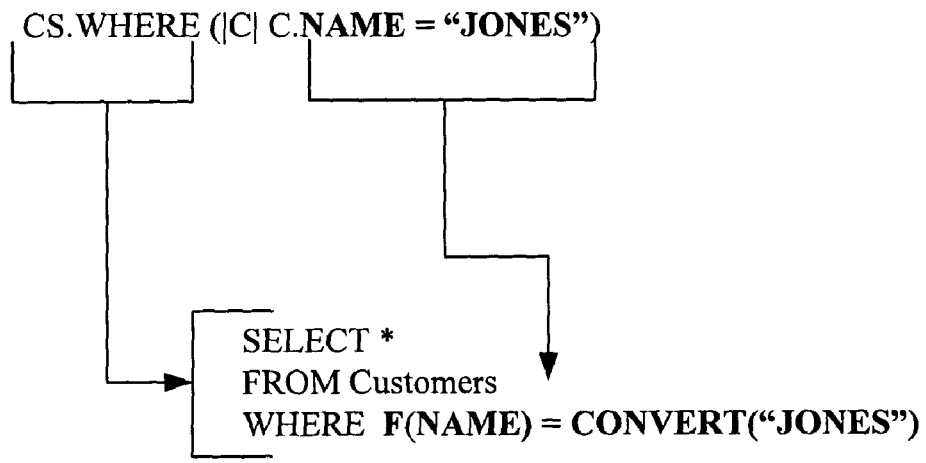
FIG. 2b illustrates an exemplary diagram of a language translation or expansion.

FIG. 2b illustrates an exemplary translation or expansion 200b to further facilitate clarity in understanding the operation of system 100 of FIG. 1. Expansion 200b is similar to that of translation 200a except that a different result is produced. Again, there is the expression "cs.where(|c| c.name="Jones")." The main expression is then expanded to a SQL type expression namely "Select*From Customers Where." This denotes select from the customers table where some condition is satisfied. The condition is specified in the sub-expression, which happens to be specified as a lambda expression. In this instance, the condition name="Jones" is translated or expanded to some other condition expression where some function is performed on name and some conversion is executed on the string Jones, for example a Unicode string can be converted to an ASCII string or the like. In other words, the same condition expression is not placed as a condition argument to the Where clause or parameter. Rather, some semantic conversion or translation is performed to ensure that the expanded expression or sub-expression in this case has the same meaning that is specified in the source language. Here the semantics of the source language are maintained.

Although expansion 200b represents a viable option for translation of source language expressions to target language expressions, statements and the like, there is at least one problem associated therewith. In particular, a programmer may be programming utilizing a source language, which is later translated to the target or destination language to insulate themselves from the details of the destination language, amongst other reasons. For example, a user may program in C# or XQuery/XPath as shorthand but the target language could be SQL for relational data access. Programmers know that a particular expression is going to be translated to a particular target language. Accordingly, they will often view what is generated and to their surprise, it may not look anything like what they expected. As illustrated with expansion 200b, all sorts of conversions and data manipulation may be necessary to maintain the semantics of the source language. In addition to surprising results, the converted expressions will likely cause execution to be slow and inefficient due to the functionality supporting semantic preservation. Still further yet, such a translation can wreak havoc on a debug process, as one minor change in the source language expression can cause dramatic changes to occur in the target language. Further, programmers will be clueless on how to tweak the produced results, as changes in the target language are non-linear as well as unpredictable in response to alterations of the source language code. The translation or expansion is essentially a black box to users or programmers.

Expansion 200a does not suffer from the same problems. Expansion 200a is not a complete semantic maintaining translation. Here, at least a portion of the expression, name="Jones" is translated one-to-one or from another viewpoint not translated at all but copied as specified in the source. This provides predictability for programmers so that they know when they specify name="Jones" this condition will be translated to name="Jones" in the destination language. There are no unexpected conversions produced to preserve the semantics of the source language. In fact, semantics are understood to come from the target language rather than the source. This provides, among other things, semantic extensibility from the target language. Thus, the translation is kind of a macro expansion that does not enforce any semantic rules of the source language. By way of example, if the expression a*b+c is written in a source language the precedent and associativity rules from the destination language will apply. Thus, if the source language semantics specify that the multiplication happen first followed by the addition and the destination language semantics specify that the addition be performed first, there will be not be any conversions or alterations to the expression such as (a*b)+c to preserve the semantics of the source language.

Figure 3:
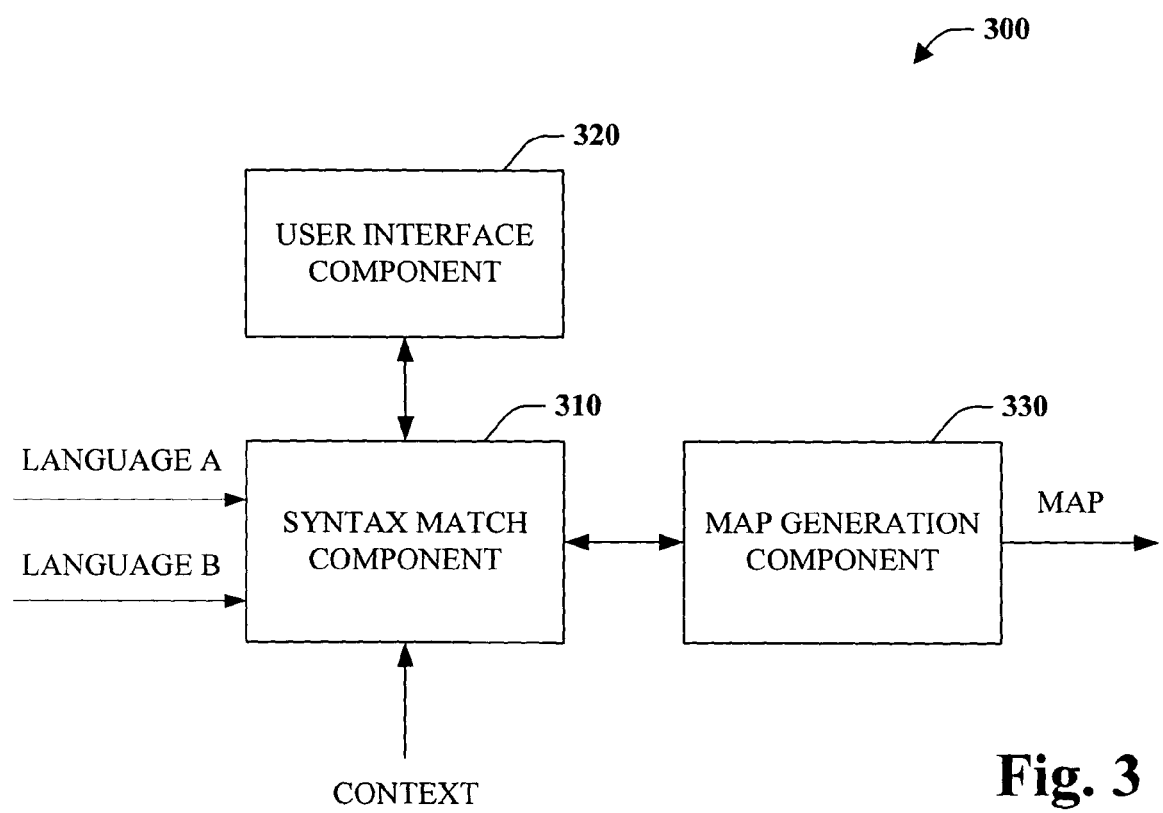
FIG. 3 is a block diagram of a map production system.

Turning to FIG. 3, a map production system 300 is depicted. The system includes a syntax match component 310, a user interface component 320 and a map generation component 330. Two languages sought to be mapped are provided to the syntax match component 310. Here, languages A and B supply input to the match component 310. The match component 310 provides a mechanism to enable the syntax of language A and language B to be matched. For example, numbers, symbols, and operators of language A can be matched to the same or corresponding numbers, symbols, and operators of language B. In addition, syntax match component can receive context information such as the names of fields, tables, variables, and the like. In this manner, a name in language A such as "cs" can be matched to "customers" table in language B, for instance. Furthermore, a user interface component 320 can be communicatively coupled to the syntax match component. The user interface component 320 provides a mechanism for a user, possibly an administrative type, to control, coordinate, or otherwise affect matching of language syntax. For example, a user could ensure that proper context information is matched and/or that like functions or operations are properly matched. The match information can be provided to the map generation component 330. The map generation component can generate a map from the match information. For example, the map can be a computer readable map or mapping file that includes the matching syntax. It should be appreciated that the map can be provided in any form, however in one instance the map can be an XML file.

Figure 4:
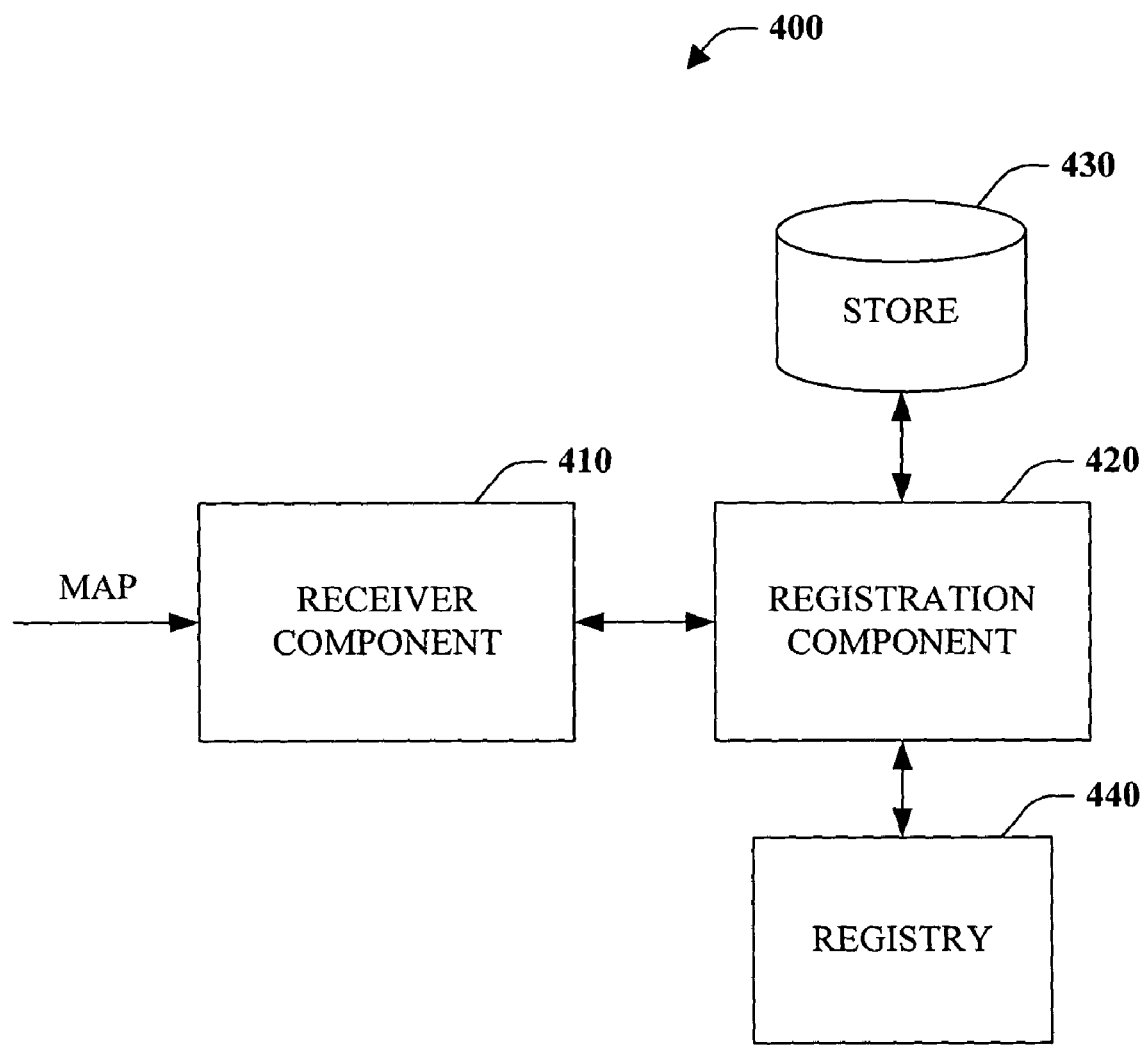
FIG. 4 is a block diagram of a language translation system that obtains non-native maps.

FIG. 4 is a language translation system 400 that obtains non-native or plug-in maps. A translation system such as that of FIG. 1 can include one or more maps for a plurality of languages. However, the system is extensible in that it can obtain new non-native maps for new languages, extensions, alternative versions of other languages and/or different context. System 400 includes a receiver component 410, a registration component 420 and a store 430. Receiver component 410 receives, retrieves or otherwise obtains a computer readable map. The map can include a mapping of the syntax of a first language to the syntax of a second language, such as from XQuery to SQL. Once received, the map can be provided to the registration component 420. Registration component 420 receives the map and can initiate storage of the map to a computer readable store 430. The registration component 420 can also generate and store an entry in a registry or log 440 to identify the map, for example by source and target language, and its location in the store 430. Upon registration, the map is available for use by a translation or expansion system such as system 100 described supra with respect to FIG. 1.

Figure 5:
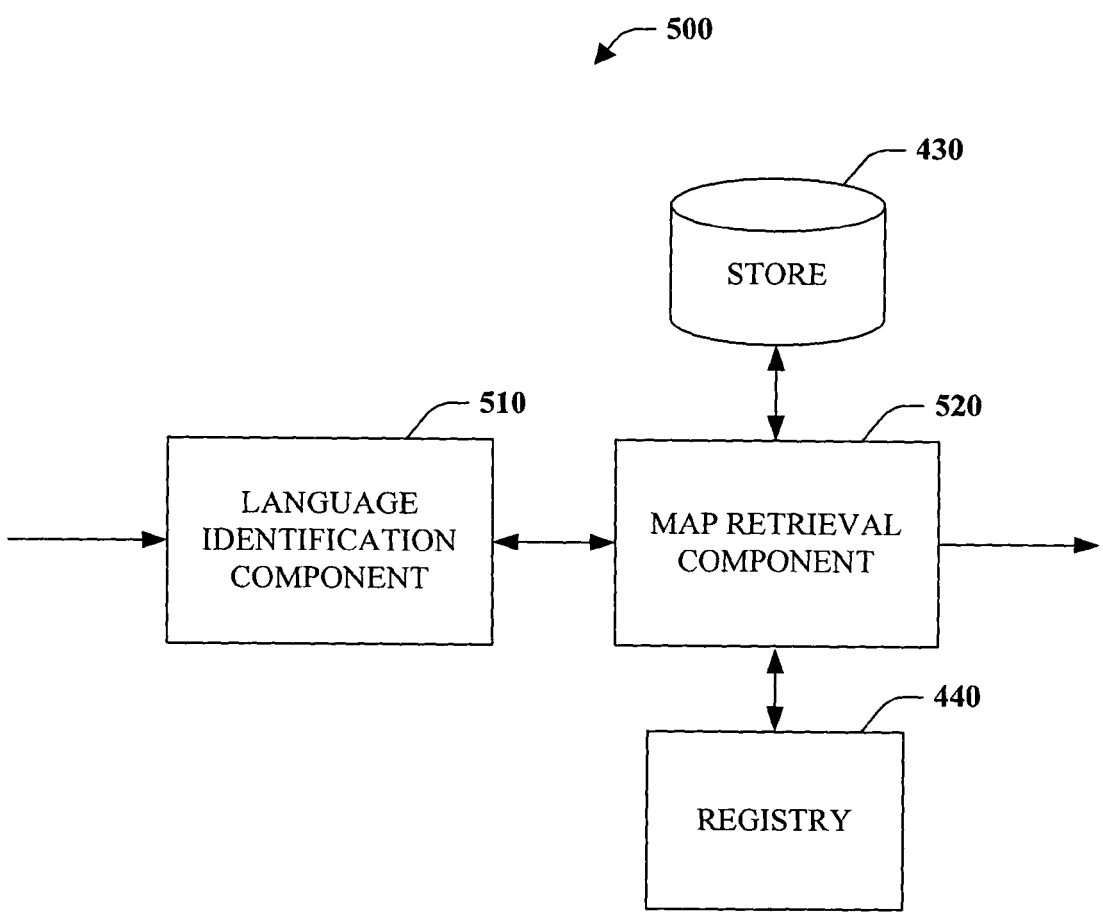
FIG. 5 is a block diagram of a language translation system that identifies a map for employment.

Turning to FIG. 5, a language translation system 500 is provided that locates a map for employment. System 500 includes a language identification component 510, a map retrieval component 520, and a store 430. Language identification component 510 analyzes a plurality of languages presented thereto to identify the language in question. The language identification component 510 provides the identity of the languages to the map retrieval component 520. The map retrieval component can subsequently identify the appropriate map given the identities of the languages and optionally some context information. For example, map retrieval component 520 can interact with the registry 440 to identity a map with particular source and target languages. The registry 440 can also identify the location or provide a pointer to an appropriate map. The map can then be retrieved from the computer readable store 430 and provided to a language translation or expansion system.

Figure 6:
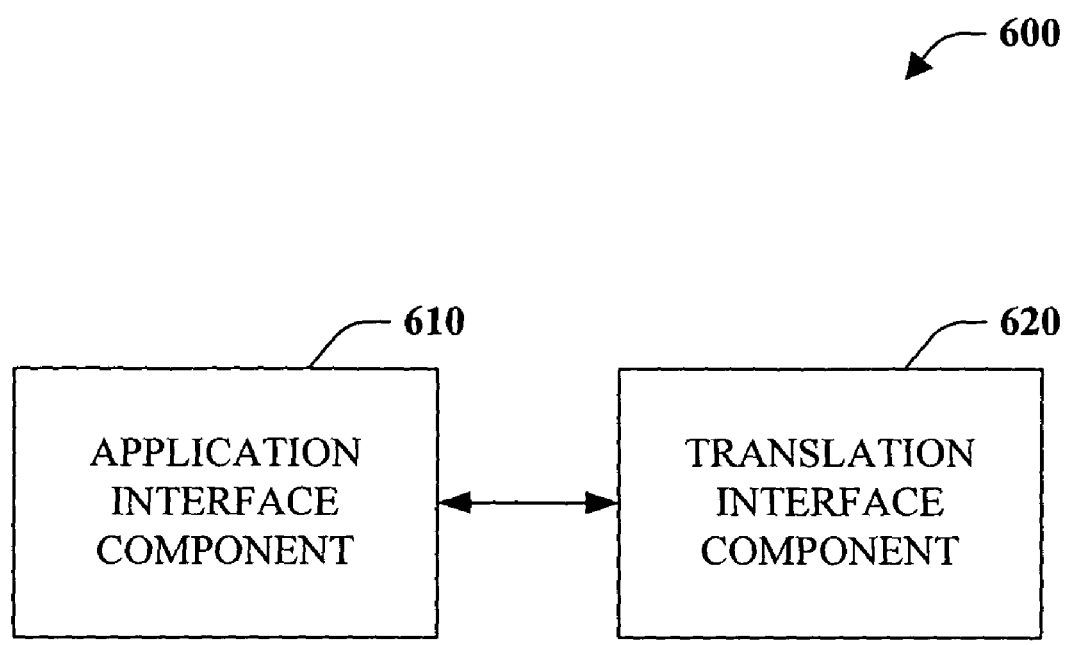
FIG. 6 is a block diagram of an interface system that facilitates interaction with a translation or expansion system.

FIG. 6 illustrates an interface system 600 for interacting with a translation or expansion system. System 600 includes an application interface component 610 and a translation interface component 620. Application interface component 610 can interact with a first computer language application. For example, the application interface component 610 can receive programmatic elements such as expressions, statements, blocks and the like. Application interface 610 can transmit or provide such programmatic elements to the translation interface component 620. The transformation interface component 620 can be communicatively coupled to or included within a translation system such that it can provide such programmatic elements for translation or expansion. Translated programmatic elements and/or other data such as results of a query can be transmitted back from the translation interface component 620 to the application interface component 610. It should be appreciated that application interface component 610 and/or translation interface 620 can form all or part of an application-programming interface (API) for interacting with a translation system. Accordingly, the interfaces can transmit any and all information related to translation or expansion of programmatic code.

To further facilitate appreciation of aspects of the disclosed subject matter, an exemplary scenario and solution thereto are provided. It should be noted that this scenario and solution is provided solely for the purpose of providing clarity with respect to particular subject matter disclosed herein and is not meant to limit the scope of the disclosed subject matter in any way. The systems and methods provided herein are applicable to a variety of different situations only one of which is described hereinafter.

It is often desirable to provide relational data as XML to database users, for instance through a web service or other type of application. In other words, provide XML views over relational data. The main attraction of using XML views over relational data is that it provides users with hierarchical views of their flat relational data and consequently makes it much simpler for them to navigate this hierarchy. In such a scenario, it has been discovered that there are several important features that determine whether users employ such technology.

First, it is important to users that there is a mechanism for simple retrieval, update, and manipulation of XML data. Database providers or owners typically establish a contract with users through some XML schema (XSD-XML Schema Definition) and allow users to get data back from the backend as XML, which is described in the XSD schema. Users prefer to be empowered to interact quickly with a database without the need to write complicated SQL queries manually.

Furthermore, it is important to provide users with efficient queries with high performance as well as predicable behavior. Users rightfully expect that conversion will not be applied that hurts performance. For example, users expect that columns that are indexed will not be converted as this substantially impairs performance. Users also do not appreciate and will often not utilize an application or technology that provides non-deterministic or non-monotonic behavior, for example, where a query behaves completely different in response to a minor change.

In addition, users have a strong perception that since their data is stored in a relational database, they should be able to use the intrinsic functionality provided by the database. When a similar function is available in XQuery and SQL, the user often expects that the SQL function be directly mapped to a corresponding XQuery function. In other words, the SQL function will be used when the query is executed.

In response to the aforementioned concerns, a language can be designed or translated such that XML views of data can be queried by transliterating path and filter expressions to the query language of the data source based on mapping information. For example, XPath/XQuery or a subset thereof can be employed to provide the ability to locate a map target such as an XML node and apply a predicate to this node. Within the predicate, any relative XML node on the self and child axes can be used to filter expressions. The expressions can be translated from XPath/XQuery to SQL where the XML items are replaced with the mapped SQL entities (e.g., table, column) and child and attribute traversal is translated to a join over the appropriate relationship between mapped tables. Queries can be translated into SQL guided by a relational to XML map or mapping to refer to appropriate tables/columns based on the location path and the node information used in the predicates. The records that result form execution of the SQL query can then be materialized into the mapped XML nodes.

Location paths are part of XQuery grammar or BNF (Backus-Naur Form or Backus Normal Form) that has the needed information on the path and predicate to facilitate translation to SQL. A relative location path can consist of a sequence of one or more locations steps separated by a delimiter such as "/." The steps in a relative location path are composed together from left to right. Each step in turn selects a node, which is a child of the node of the prior step. An absolute location path consists of "/" optionally followed by a relative location path. A "/" by itself selects the root node of the document containing the context node. If it is followed by a relative location path, then the location path selects the set of nodes that would be selected by the relative location path relative to the root node of the document containing the context node. In BNF form:

```
PathExpr::= RelativePathExpr | "/"RelativePathExpr?
RelativePath::= StepExpr("/" StepExpr)*
```

A location step either selects a named child, attribute, or itself. For instance, consider the following BNF:

```
StepExpr ::= AxisStep | FilterExpr
AxisStep ::= ForwardStep PredicateList
ForwardStep ::= AbbrevForwardStep
AbbrevForwardStep ::= "@"? QName
FilterExpr ::= PrimaryExpr PredicateList
```

A predicate filters a node-set with respect to the path to produce a new node-set. The predicate expression is translated to SQL based on the node the path specifies that serves as the context node. In BNF:

PredicateList::='['Expr']'*

Expressions are needed for filter-expressions. Parentheses may be used for grouping. Consider the following BNF for expressions:

```
PrimaryExpr ::= Literal | VarRef | '(' Expr ')' | ContextItemExpr | FunctionCall
Literal ::= Same literals as SQL
VarRef::= "$" QName
ContextItemExpr ::= '.'
Expr ::= Expr BinaryOperator Expr | UnaryOperator Expr | PathExpr
BinaryOperator ::= '*' | 'div' | 'mod' | '+' | '−' | '=' | '>' | '<' |
'>=' | '<=' | '!=' | '!>'
| '!<' | '^' | '&' | '|' | 'NOT' | 'AND' | 'ALL' | 'ANY' | 'BETWEEN' |
'IN' | 'LIKE' |
'OR' | 'SOME' | 'IS NULL'
UnaryOperator ::= '−' | '+' | '~'
```

It should be noted that the precedence and associatively of the operators is the same as in SQL. The effect of the above grammar is that the order of precedence is (highest precedence first):

```
+ (Positive), − (Negative), ~ (Bitwise NOT) (note: Unary operator)
* (Multiply), / (Division), % (Modulo)
+ (Add), (+ Concatenate), − (Subtract)
=, >, <, >=, <=, <>, !=, !>, !< (Comparison operators)
^ (Bitwise Exlusive OR), & (Bitwise AND), | (Bitwise OR)
NOT
AND
ALL, ANY, BETWEEN, IN, LIKE, OR, SOME, IS NULL
```

When two operators in an expression have the same operator precedence level, they are evaluated left to right based on their position in the expression.

Consider the example presented hereinafter. The following sets forth a SQL query into the XML data type:

CREATE TABLE XmlDT(name nvarchar(15), data xml)

INSERT XmlDT VALUES ('Joe', '<Order><Item>TabletPC</Item></Order>')

INSERT XmlDT VALUES ('Jim', '<Order><Item>Laptop</Item></Order>')

The relevant mapping file is:

```
<Map Source="XmlDT" Target="Sample">
    <FieldMap SourceField="name" TargetField="@name"/>
    <FieldMap SourceField="data" TargetField="Order"
    xe:MergeToLevel="true"/>
</Map>
```

The applicable query:

```
/Sample[Order.value('(Order/Item)[1]','nvarchar(15)')='TabletPC']
Will generate the following SQL statement
SELECT name,data
FROM XmlDT
WHERE data.value('(Order/Item)[1]','nvarchar(15)') = 'TabletPC'
```

The aforementioned systems have been described with respect to interaction between several components. It should be appreciated that such systems and components can include those components or sub-components specified therein, some of the specified components or sub-components, and/or additional components. For example, a system could include parser component 110, translation component 120, syntax match component 310, user interface component 320, map generation component 330, receiver component 410, registration component 420, language identification component 510, and map retrieval component 520, or a combination thereof. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers ... ). Such components, inter alia, can automate certain mechanisms or processes performed thereby to make portions of the systems and methods more adaptive as well as efficient and intelligent. For example, translation component 120 could utilize artificial intelligence, machine learning or like mechanisms to facilitate expansion or translation of code. Additionally or alternatively, syntax match component 310 can employ such intelligent mechanisms to facilitate matching of the syntaxes of a plurality of languages.

In view of the exemplary systems described supra, methodologies that may be implemented in accordance with the disclosed subject matter will be better appreciated with reference to the flow charts of FIGS. 7-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 7:
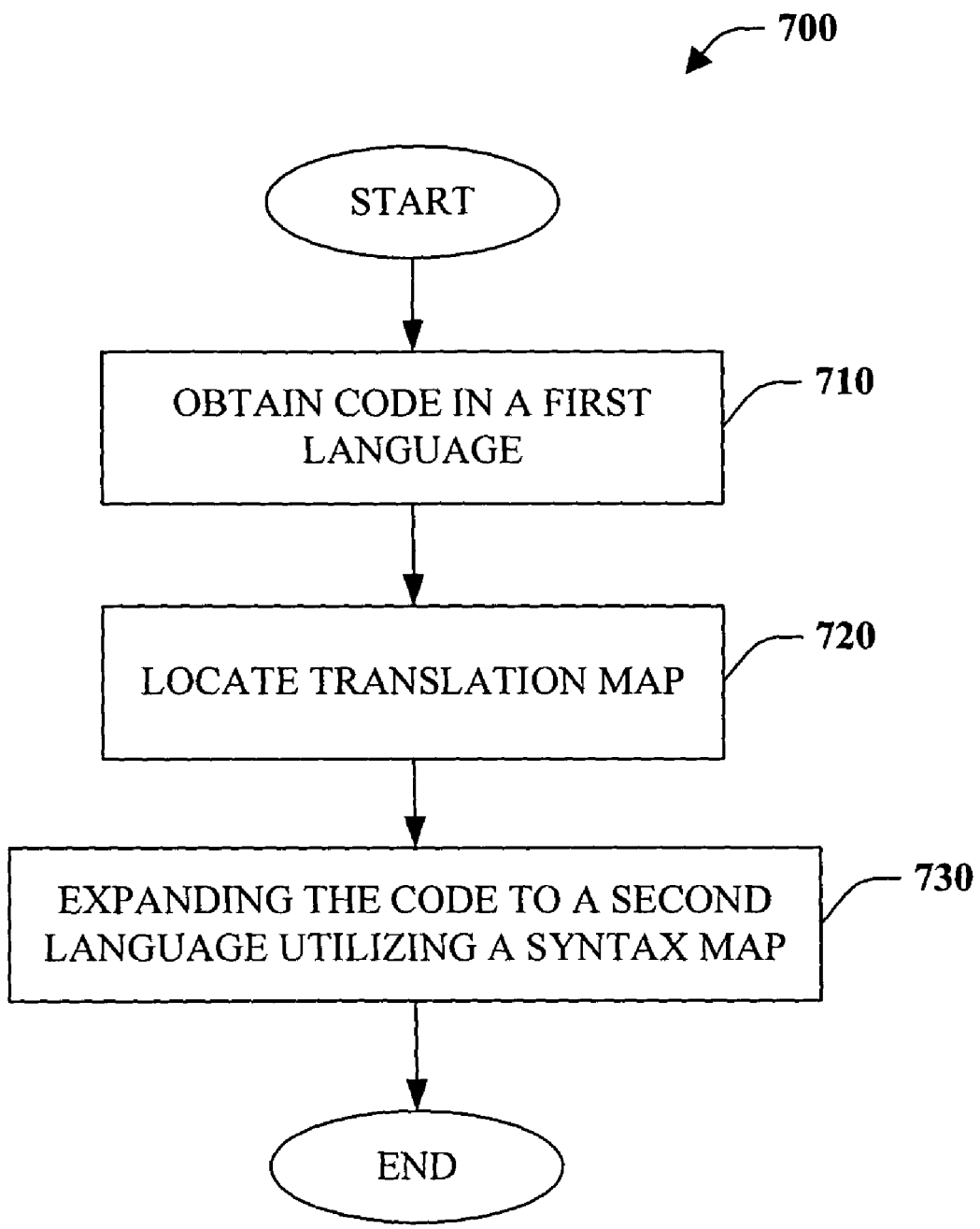
FIG. 7 is a flow chart diagram of a language translation methodology.

Turning to FIG. 7, a language translation methodology 700 is depicted. At 710, code is obtained in a first or source language. By way of example and not limitation, the first language could be an object-oriented language or a markup query language. At 720, a translation or syntax map is located. The map can provide syntactic information regarding translation from the syntax of the first source language to syntax of a second target language. The map can be stored on a computer readable medium or stored within a translation system. At 730, the code obtained from the first language is expanded to code of a second language utilizing the syntax map. Methodology 700 can be utilized, for instance, to translate an XML based query to a relational based query, perhaps in SQL. The query could be executed by a query processor and relational results generated. A similar methodology can be employed to subsequently pass the results back in XML. For example, the same map can be employed, or another map located, where SQL is the source and XML is the target language. The results can then be translated back to XML utilizing the map.

Figure 8:
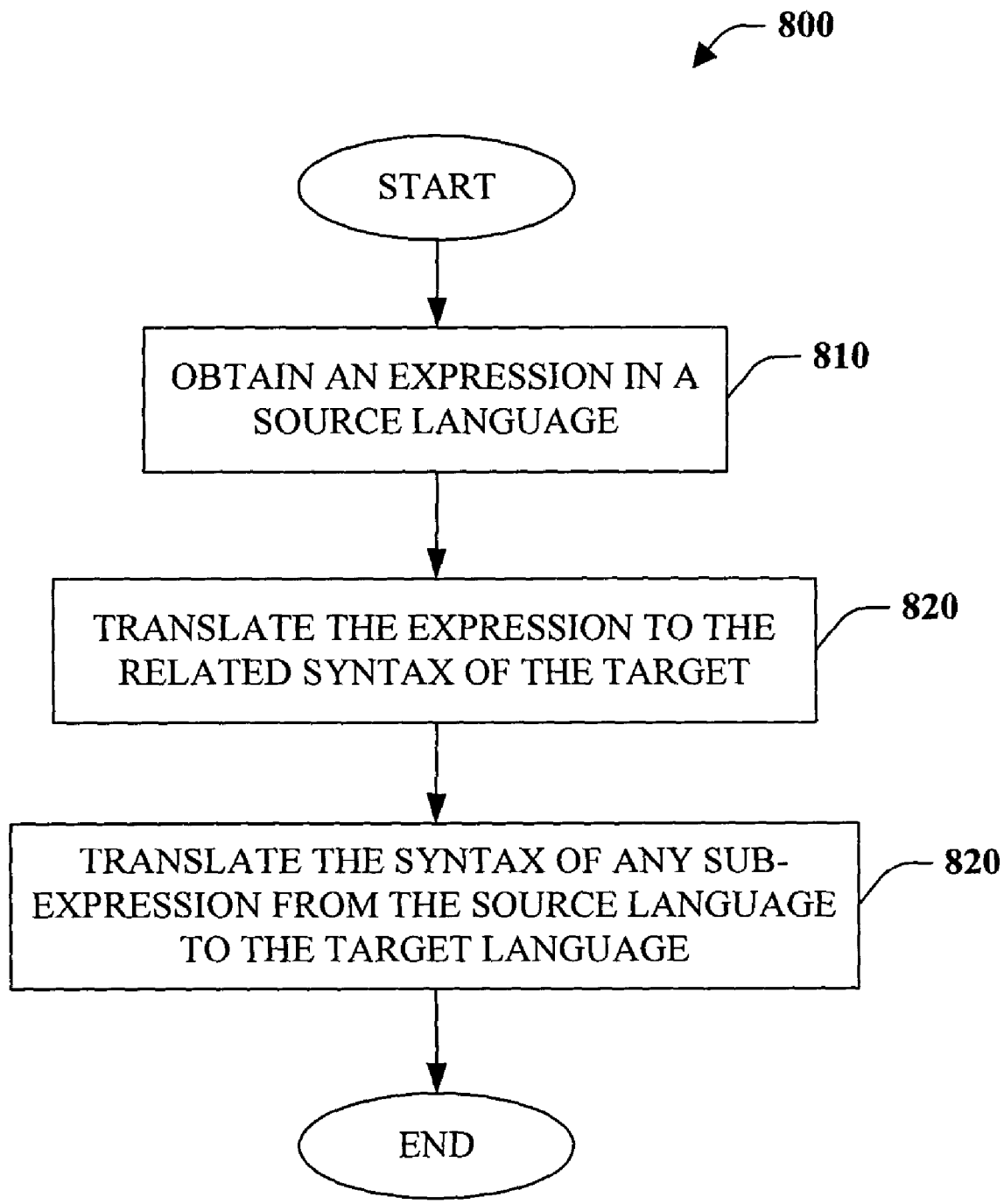
FIG. 8 is a flow chart diagram of a method of expression translation.

FIG. 8 is a flow chart diagram of a method 800 of expression translation. At reference numeral 810, an expression (e.g., query expression) in a source language is received, retrieved, or otherwise obtained. The expression can include a sub-expression as an argument. For example, the expression can specify a path or location of data and the sub-expression can specify some filter logic or predicate. At 820, the expression is translated to an expression of related syntax of a target language. This translation action can relate to the main expression, for instance, an object oriented or mark-up language expression identify data to be queried such that the expression is translated to a target language such as SQL. By way of example, the expression "cs.where" of "cs.where(|c| c.name="Jones")" can be translated to Select*From Customers Where. In this case, the Where clause does not include any logic or expressions, as that is provided by the sub-expression. At 820, the syntax of the sub-expression is translated from the source language to the target language and populates the syntax or structure generated from the main expression. The translation of the sub-expression does not need to preserve the semantics of the source language. Accordingly, the sub-expression or a portion thereof can be translated verbatim thereby preserving solely the syntax of the sub-expression. In the previous example, the sub-expression "|c| c.name="Jones"" can be translated simply to "name="Jones"" and provided as an argument to the Where clause.

Figure 9:
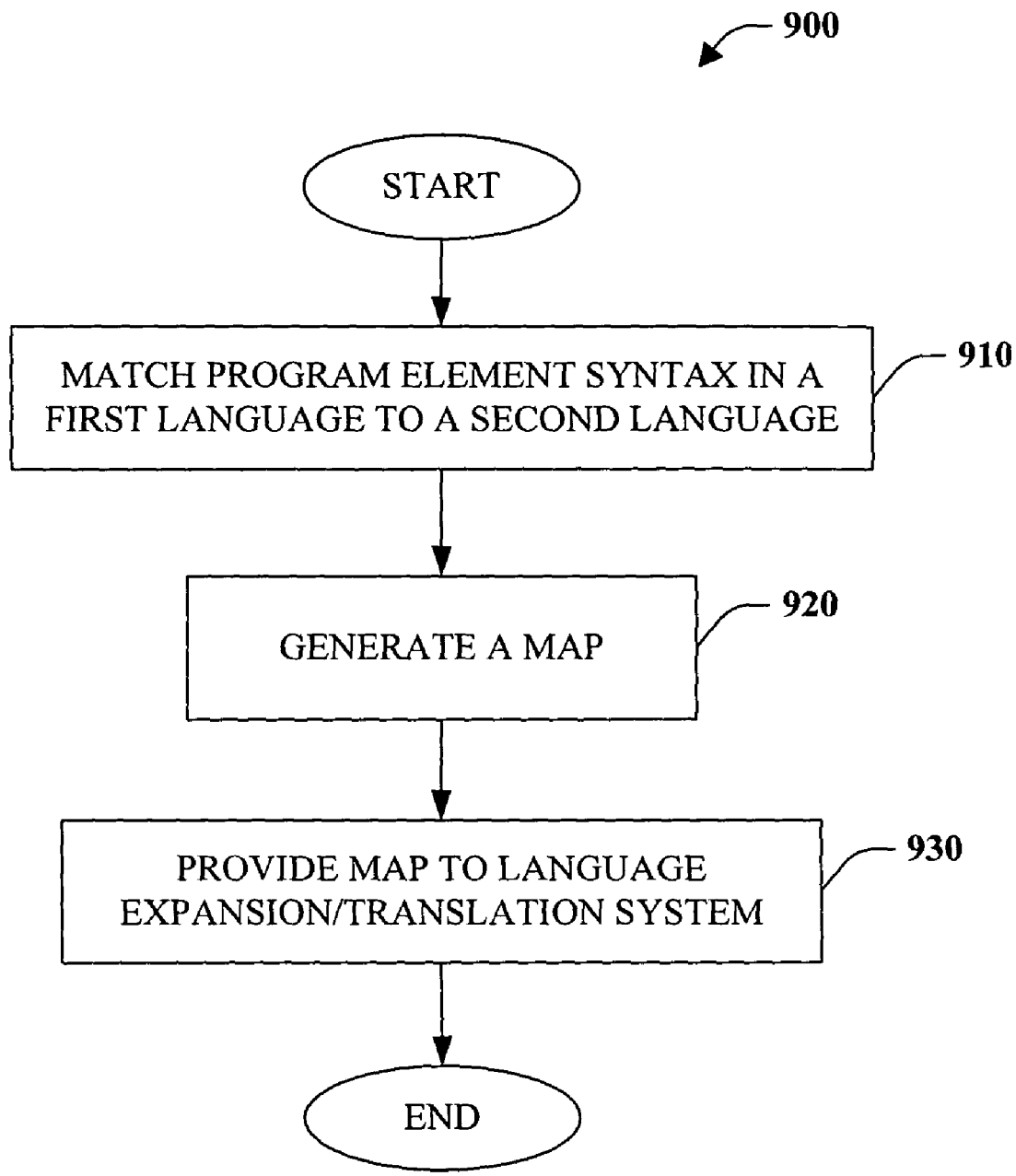
FIG. 9 is a flow chart diagram of a translation map method.

FIG. 9 illustrates a translation or expansion map method 900. At reference numeral 910, the program syntax of a first language is matched to program syntax of a second language. This act can be automatic, semi-automatic or manual. At 920, a map can be generated based on the matching information. The map can include mapping of corresponding fundamental elements such as operators and also include data or implementation specific information, for example, "cs" corresponds to the table named "customers." At 930, the generated map can be provided to a language expansion/translation system for employment. Method 900 can be utilized to produce both native and non-native maps. Accordingly, a translation system vendor may employ method 900 to produce maps to be included by the system. Additionally or alternatively, third parties may create their own maps, which can be added or plugged-in to the system.

Figure 10:
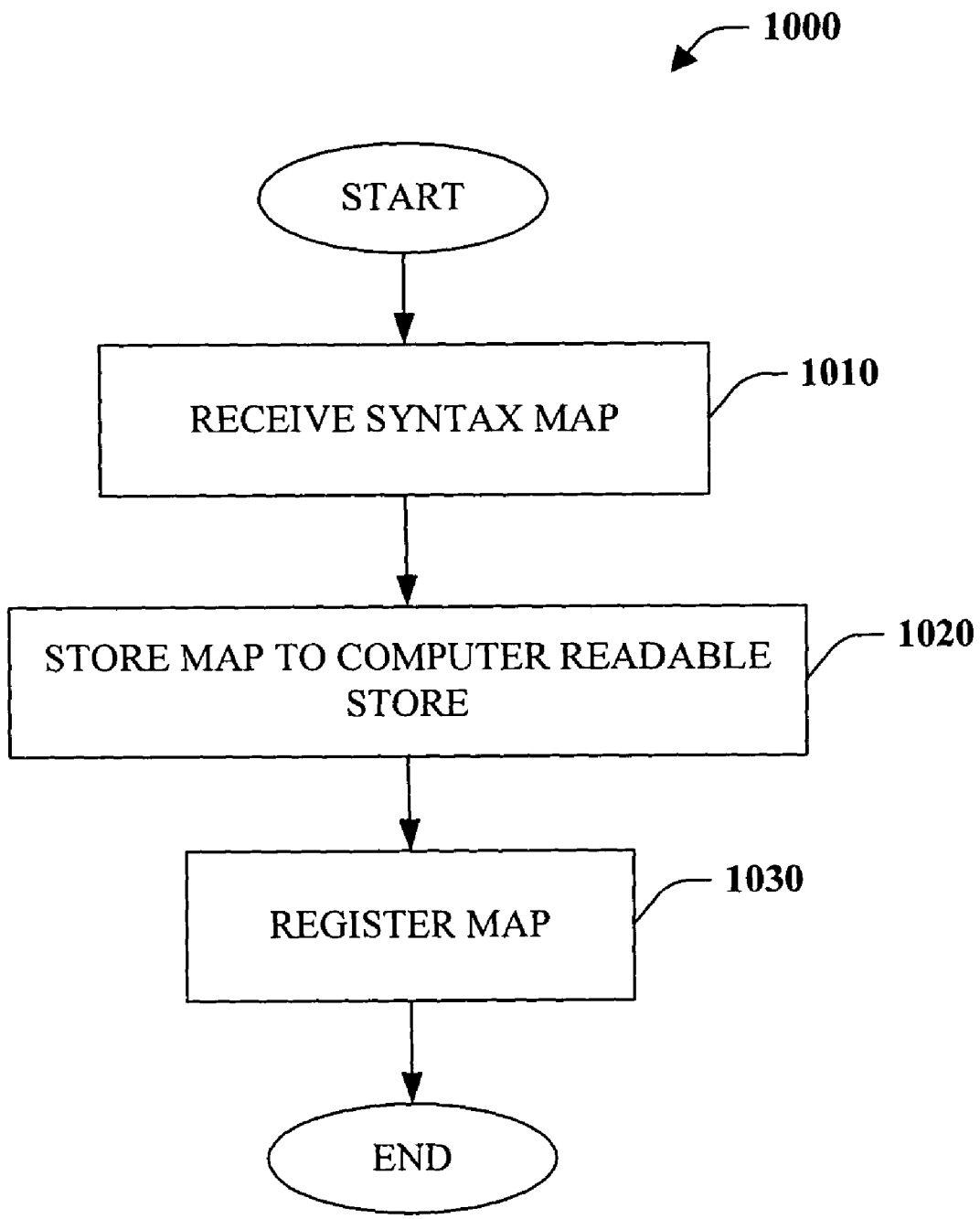
FIG. 10 is a flow chart diagram of a map registration methodology.

FIG. 10 illustrates an expansion or translation system map registration methodology 1000. By way of example and not limitation, method 1000 can be utilized for support of plug-in or non-native maps. At 1010, a syntax map is received, retrieved or otherwise obtained. As described previously, the map can record corresponding syntax from a plurality of languages including, among other things, operators and context specific information (e.g., data schema). At 1020, the map is persisted to a computer readable store. At 1030, the map is registered. Registration can include, inter alia, recording the location of the map or a pointer thereto as well as information pertaining to the languages on which the map can operate. Once the map is registered, it is available for use. Method 1000 provides a means for receiving and operating on native as well as non-native maps.

Figure 11:
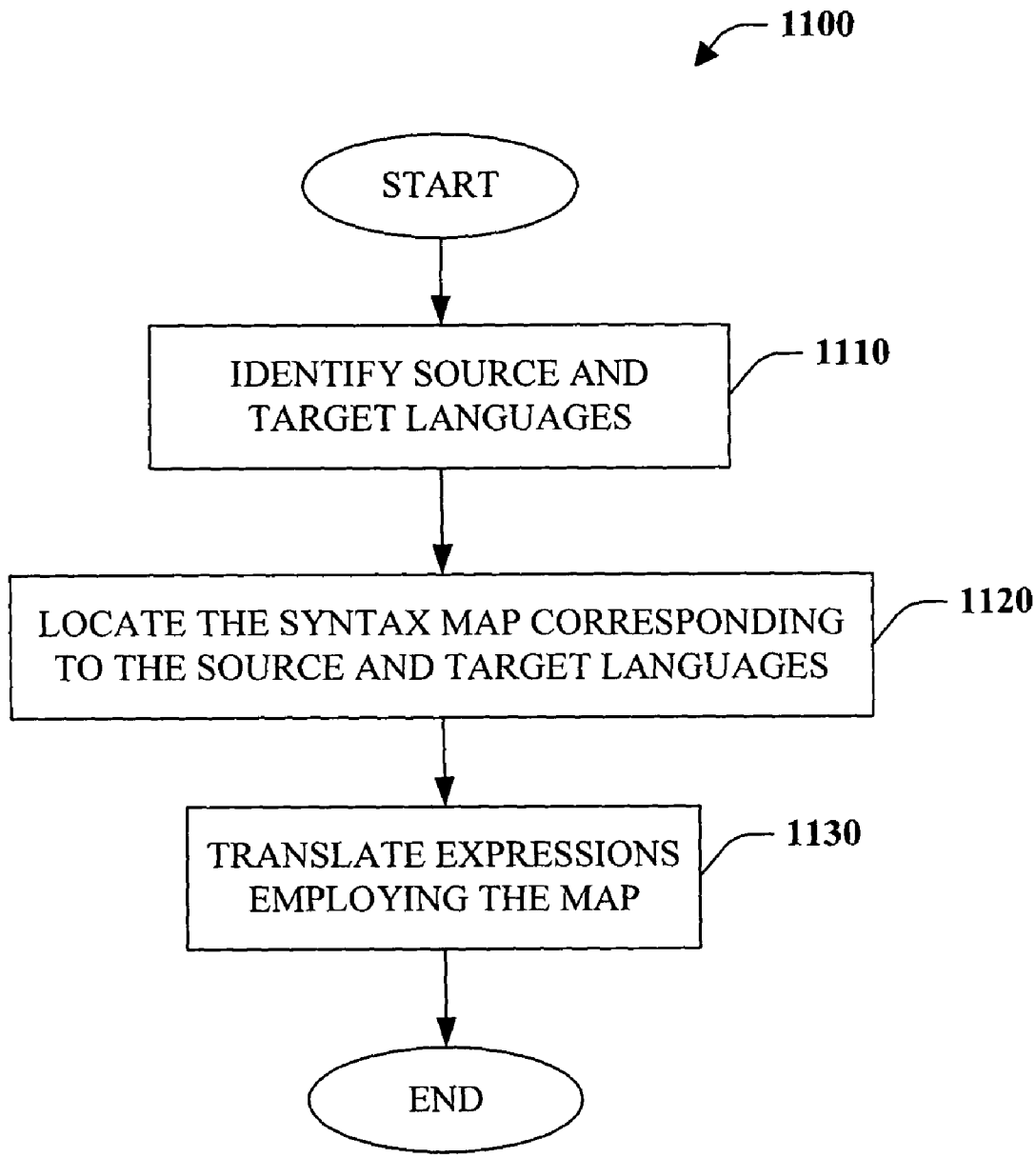
FIG. 11 is a flow chart diagram of a translation or expansion methodology.

Turning to FIG. 11, a flow chart of a translation methodology 1100 is depicted. At reference numeral 1110, source and target languages are identified. For example, XPath could be the source and SQL could be the target, or vice versa. At 1120, a syntax map is located that maps the source and target languages. This could be accomplished by consulting a registry and retrieving a pointer to the location of the appropriate map to perform the expansion. Finally, at 1130, one or more expressions or other program units or elements are translated utilizing the map. The translation is a translation from the syntax of the source to the syntax of the target without complete enforcement of the semantics of the source language. Semantics can be defined by the target language.

Figure 12:
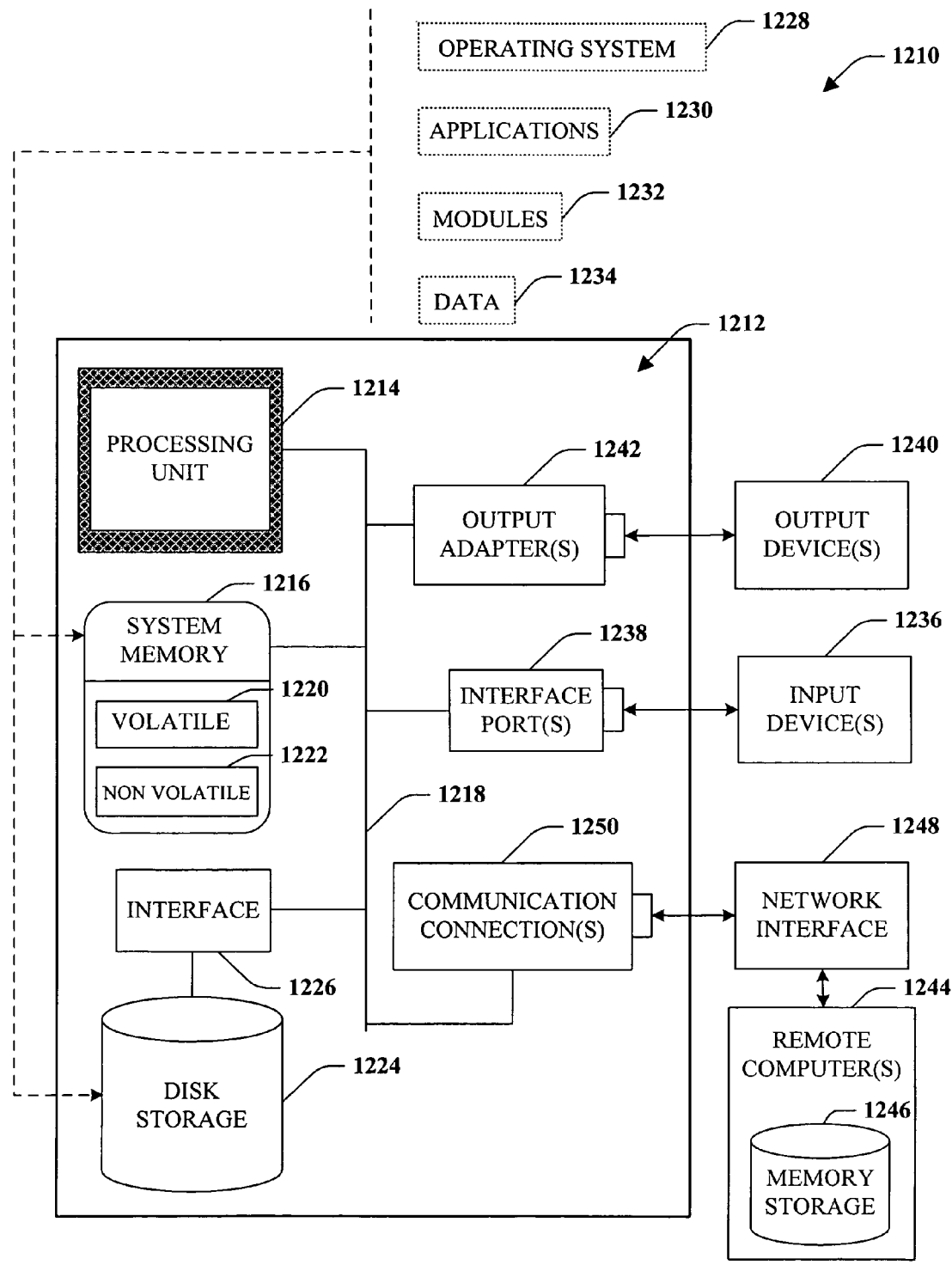
FIG. 12 is a schematic block diagram illustrating a suitable operating environment.
Figure 13:
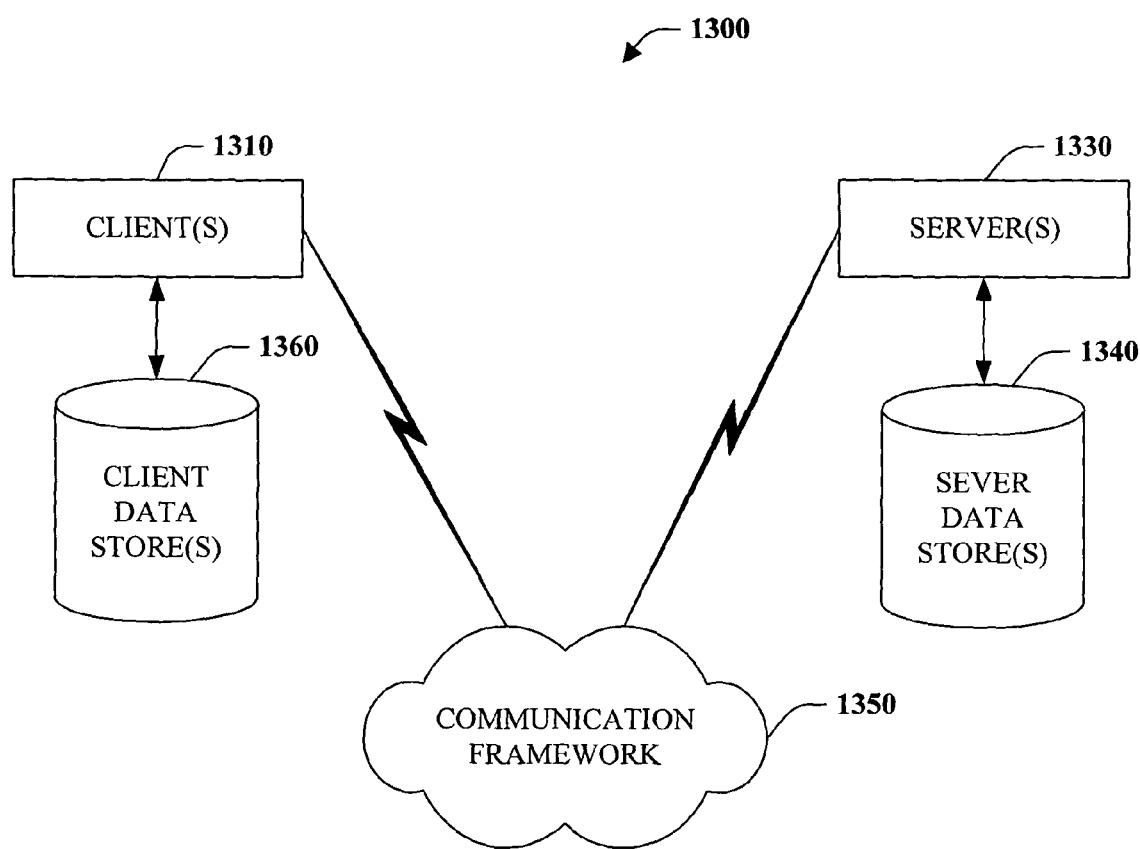
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel, CRT, LED, LCD . . . ), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes.

The environment 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A translation system for computer programming code, comprising:
   a processor;
   a parser component that receives programmatic code;
   a language identification component that identifies a source language and a target language;
   a generation component that generates a map that respectively associates syntax, operations, and identifier names of the source language with that of the target language;
   a map retrieval component that locates the map that facilities translation from the source language to the target language;
   a syntax match component that identifies from the map closest related syntax, operations, and identifier names between programmatic elements of the source language and the target language; and
   a translation component that performs a syntactic translation of the programmatic code associated with the source language to the target language based in part on semantics defined by the target language and the identified closest syntax, operations, and identifier names from the map, wherein the translation component performs the syntactic translation by at least copying verbatim a sub-component of the programmatic code that has a semantic meaning in the source language that is different than a semantic meaning in the target language such that the semantic meaning in the target language is used to interpret the translated sub-component rather than preserving the semantic meaning in the source language.

2. The system of claim 1, wherein the sub-component comprises an identifier name.

3. The system of claim 2, the source language is an object-oriented language and the target language is a database query language.

4. The system of claim 2, the source language is an XML query or transformation language and the target language is a database query language.

5. The system of claim 1, further comprising a receiver component that receives a map from outside the system and a registration component that stores the map to a computer readable storage device.

6. A programmatic expansion method, the method comprising the following computer implemented steps:
   identifying a first program language and a second program language;

obtaining an expression including at least one sub-expression in the first program language;

locating a syntax map that respectively associates syntax, operations, and identifier names of the first program language with that of the second program language;

identifying from the syntax map closest related syntax, operations, and identifier names between programmatic elements of the first program language and the second program language;

translating the expression to corresponding syntax of the second program language based in part on semantics defined by the second program language and the identified closest related syntax, operations, and identifier names from the syntax map; and copying at least a portion of the sub-expression logic verbatim from the first program language to the second program language based in part on semantics associated with the second program language without preserving semantics of the first program language, wherein at least a portion of the sub-expression logic has a semantic meaning in the first program language that is different than a semantic meaning in the second program language such that the semantic meaning in the second program language is used to interpret the at least a portion of the sub-expression logic rather than preserving the semantic meaning of the first program language.

7. The method of claim 6, wherein the first program language expression is a query and the second program language is a data source query language.

8. The method of claim 7, wherein the first program language is object oriented.

9. The method of claim 7, wherein the first program language is an XML query or transformation language and the second program language is a structured query language.

10. The method of claim 7, wherein the first programming language is a data-oriented language and the second program language is a structured query language (SQL), and wherein the expression is a path and the sub-expression is a predicate or filter expression translated directly into a Where clause of a Select statement.

11. A syntactic translation method, the method comprising the following computer implemented steps:

obtaining syntax of a first program language;

automatically matching syntax of a second program language to the first program language;

generating a map of corresponding syntax, operations, and identifier names that are respectively associated with the first program language and the second program language;

identifying from the map closest related syntax, operations, and identifier names between programmatic elements of the first program language and the second program language;

translating programmatic code associated with the first program language to the second program language based in part on semantics defined by the second program language and the identified closest related syntax, operations, and identifier names from the map, wherein the translation includes copying verbatim a sub-component of the programmatic code that has a semantic meaning in the first program language that is different than a semantic meaning in the second program language such that the semantic meaning in the second program language is used to interpret the translated sub-component without preserving the semantic meaning of the first program language, and employing at least one of artificial intelligence or machine learning to assist with at least one of matching the syntax or translation of the second program language with the first program language.

12. The method of claim 11, further comprising obtaining context information and employing such information in generating the map.

13. A computer readable storage device having stored thereon computer executable instructions for carrying out the method of claim 11.

* * * * *